United States Patent [19]

Martin

[11] Patent Number: 4,492,631

[45] Date of Patent: Jan. 8, 1985

[54] CENTRIFUGAL SEPARATOR

[75] Inventor: H. Woods Martin, Houston, Tex.

[73] Assignee: AE PLC, Warwickshire, England

[21] Appl. No.: 551,510

[22] Filed: Nov. 15, 1983

Related U.S. Application Data

[63] Continuation of Ser. No. 340,884, Jan. 19, 1982, abandoned.

[51] Int. Cl.[3] .............................................. B01D 33/04

[52] U.S. Cl. .................................... 210/127; 210/354; 210/377; 494/901

[58] Field of Search .................... 55/53, 196; 210/105, 210/123, 127, 136, 354, 377; 494/2, 6, 26, 36, 49, 901

[56] References Cited

U.S. PATENT DOCUMENTS

| | | | |
|---|---|---|---|
| 1,657,941 | 1/1928 | Sharples et al. | 233/13 |
| 2,543,813 | 3/1951 | Stover | 210/127 X |
| 2,792,172 | 5/1957 | Tait | 233/2 |
| 2,983,384 | 5/1961 | Winslow | 210/132 |
| 3,432,091 | 3/1969 | Beazley | 233/23 R X |
| 3,791,576 | 2/1974 | Bazil | 233/23 R X |
| 3,885,734 | 5/1975 | Lee | 233/13 X |
| 3,945,464 | 3/1976 | Sato | 233/23 R X |
| 4,046,315 | 9/1977 | Klingenberg et al. | 233/23 R X |
| 4,067,807 | 1/1978 | Busse et al. | 210/127 X |
| 4,106,689 | 8/1978 | Kozulla | 233/23 R |
| 4,165,032 | 8/1979 | Klingenberg | 233/47 R X |
| 4,221,323 | 9/1980 | Courtot | 233/23 R |
| 4,309,285 | 1/1982 | Gallaher | 210/123 |

FOREIGN PATENT DOCUMENTS 1097316 7/1955 France .

*Primary Examiner*—Robert Spitzer

*Attorney, Agent, or Firm*—Pearne, Gordon, Sessions, McCoy, Granger & Tilberry

[57] ABSTRACT

A centrifugal separator for separating contaminants from contaminated oil has an outer casing and a rotor within that casing mounted for rotation about a vertical axis. Oil under pressure enters the rotor at one end and at the other end exits through jets into a chamber within the casing which is normally filled with air. As the jets of oil impinge upon the inner wall of the casing, a small amount of air becomes entrained in the oil and as the oil flows to a sump, the air is gradually removed from the interior of the casing. In order to prevent a build-up of oil within the casing, which could interfere with rotation of the rotor, air under pressure is supplied to the interior of the casing by means of a float-operated valve member so that while the valve member is normally closed, any increase in the oil level will cause the float to rise with that oil level and thereby open the valve to allow additional air to enter into the interior of the casing.

17 Claims, 4 Drawing Figures

Fig-2
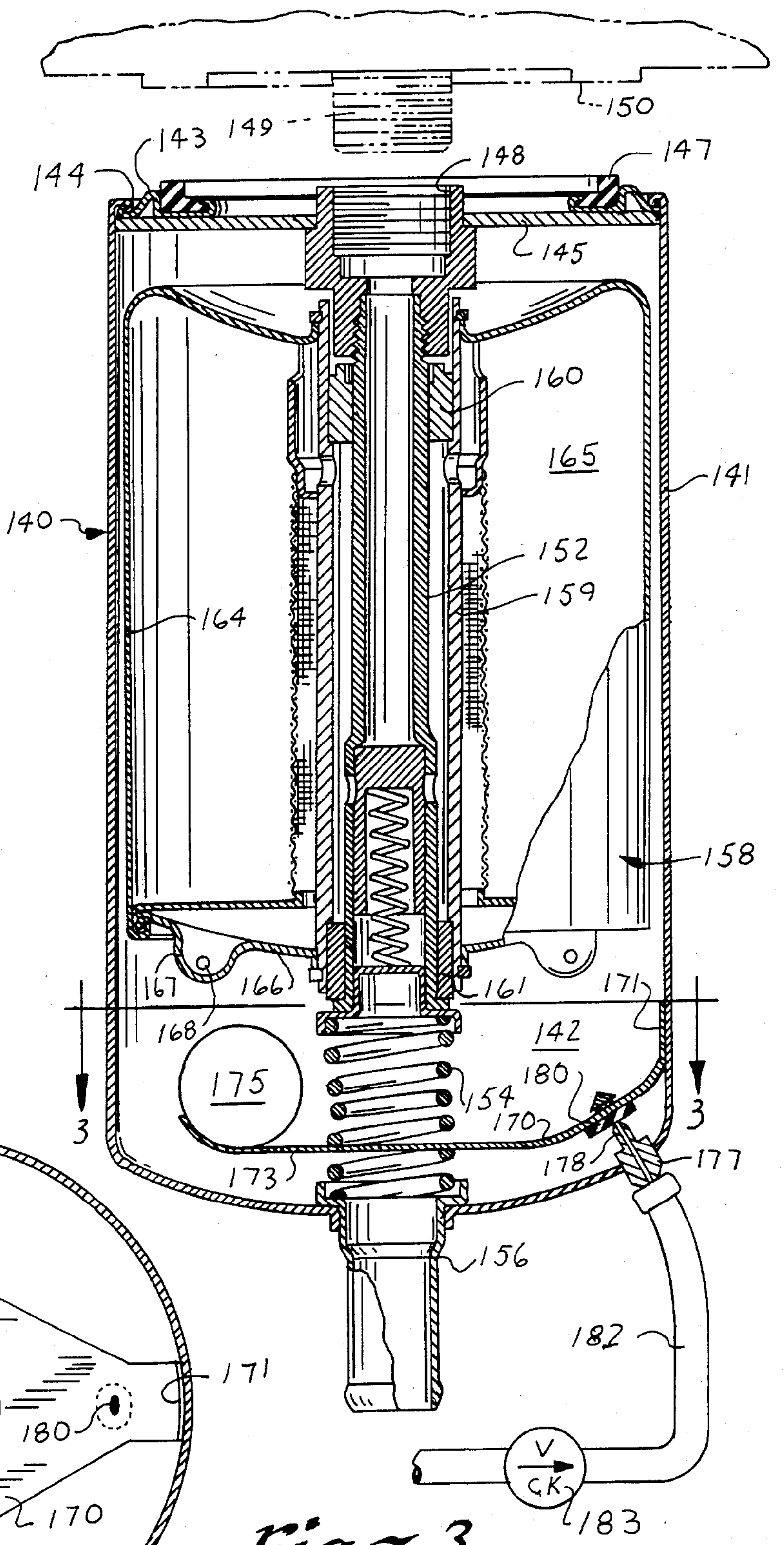
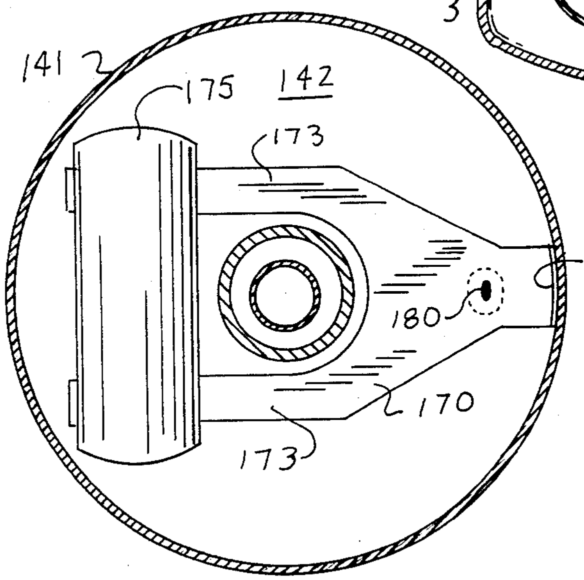
Fig-3

CENTRIFUGAL SEPARATOR

This is a continuation, of application Ser. No. 340,884, filed on Jan. 19, 1982, now abandoned.

BACKGROUND OF THE INVENTION

This invention relates generally to separators, and more particularly to centrifugal separators of the self-powered type that can be used for removing contaminants from a liquid system such as the lubricating oil system of internal combustion engines.

In order to obtain long operating life for machinery such as internal combustion engines, it is extremely important to provide the highest level of filtration capacity and ability in the system to continually remove polluting materials such as particulates, as they become present or enter into the lubricating oil. Generally, these filters can be classified as one of two types, either full flow or bypass filters. In the full flow filter, a porous type filtering element is used, and it is placed directly between the oil pump and the remainder of the lubricating system so that all of the oil passes through the filter. Such filters generally tend to have filtering elements of relatively large porosity, not only because they must pass a relatively high volume of oil with a minimum of pressure drop across the filter, but also because as the contaminants are filtered out of the oil and remain on the filter element, they tend to reduce the size of the pores, which further limits the filtering action and increases the problems of rate of oil flow through the filter. With such full flow filters, it may be necessary to provide a bypass passage so that when the filter produces an excessive amount of restriction, oil flow is allowed to pass directly around the filter and such oil receives no filtering action whatever. Furthermore, because of the relatively large porosity of the filter elements, there are a number of fine-grained particulate materials which are not filtered out of the oil because they are too small to be retained on the filter element.

The other type of oil filter is the bypass type in which a certain amount of oil as it leaves the oil pump is diverted into a filter from which it returns to the oil sump to be recirculated through the oil pump without passing through the remainder of the lubricating system. While such bypass filters filter only a portion of the oil being pumped, they can be very efficient in terms of removing very small particulates because they operate under a high pressure drop between the supply pressure and the oil sump.

While bypass filters may be of the mechanical type having a porous filter element, centrifugal type filters are quite advantageously used in such applications. A typical such centrifugal filter is the one shown in Beazley U.S. Pat. No. 3,432,091, which includes a hollow casing within which is rotatably mounted a rotor element having an internal chamber and an outer wall. The casing is connected directly to the sump or drain, while high pressure oil is directed into the interior of the rotor. As the rotor fills with pressurized oil, the oil passes downwardly to a pair of diametrically located discharge orifices or jets having a restricted diameter. As the oil passes out through these orifices, it creates a reaction force which causes the rotor to spin within the housing, causing a centrifugal force on the wall of the rotor that attracts solid particles which then adhere to this wall both by centrifugal force when the rotor is rotating and by mechanical cohesion when the rotor stops whenever the machinery supplying the oil is stopped. As the oil is discharged from the orifices or jets, it undergoes a pressure drop from the high pressure within the rotor to what is substantially an atmospheric pressure within the housing from which it flows back to the oil sump. Because this type of filter allows high speed of rotation of the rotor, very high centrifugal forces can result, so that even very fine and lightweight contaminant particles can build up and be retained on the wall of the rotor. Generally, such filters have been the reusable type where the housing can be dismantled and a rotor removed and opened up so that the contaminants can be removed as a sludge from the interior, but it is also recognized that such filters may be made of a disposable type in which the entire unit is removed and replaced with a new one after a certain predetermined period of time. Such disposable filters have been shown in U.S. Pat. Nos. 4,106,689 and 4,165,032.

When centrifugal filters of this type function normally, they will remove a very high proportion of the contaminants and keep the lubricating oil from deteriorating. Thus, when such filters are used in motor vehicles having known duty conditions, it can easily be discovered that filter cleaning or replacement should be done at certain regular intervals, and if the filter has been functioning in its intended manner, there should be a predictable amount of accumulated sludge in the filter rotor. However, when such an inspection or cleaning is done and the expected amount of sludge is not found in the rotor, it must be assumed that the filter has not been functioning in the intended manner. This presumably results either from the rotor not reaching the intended operating speed of rotation or by the fact that perhaps at certain times the rotor was not even spinning at all. Malfunctions of this type have been known to occur from unexpected blockages of the supply line or damage to the rotor bearings, as well as possible clogging of the orifices. A more common cause of improper operation, however, has been found to result from improper drainage of the outer housing chamber or return line, which causes discharge oil to back up in the bottom of the filter. If this occurs, the lowest portion of the rotor, which may include the portions having the jet orifices, will become submerged in the excess oil and cause a frictional drag on the rotor that will greatly reduce its speed, and thereby virtually eliminate its filtering efficiency.

To overcome this problem, it has been recognized that it is necessary to provide an unrestricted drain line back to the sump, and while, ideally, this can be done by mounting the filter on the sump, this is usually not practical for most installations. As a result, installations where the filter is remote from the engine require the use of a relatively large diameter, and hence rather inflexible, hose connected between the bottom of the filter housing and the oil sump. Furthermore, the routing of this hose must be done quite carefully to avoid any possibility of sharp bends or complicated paths that could restrict the flow path. Additionally, care must be taken to avoid the possibility of getting an air bubble in the drain line, since it is recognized that under normal operating conditions, the air pressure within the outer housing should be equal to atmospheric pressure, and there is no positive pressure forcing the oil through the drain line.

One solution to this problem that has been used is to provide an atmospheric vent valve on the upper side of the outer housing to provide a bleed that would allow atmospheric air to enter the housing. However, such bleed must include a reverse flow check valve in case the internal housing does become pressurized because of an unanticipated blockage in the drain passages, which particularly may tend to happen when the engine is first started and the oil is relatively cold, and therefore of higher viscosity. Such check valve, however, can allow other contaminants to enter the filter from the exterior, and may, under some circumstances, permit the escape of oil.

Another proposed solution to the problem is that disclosed in U.S. Pat. No. 4,046,315, in which part of the incoming oil bypasses the centrifugal filter and is directed directly back to the sump through a jet pump arrangement below the housing. This jet pump is then intended to provide a positive dynamic pumping action in the cavity to positively remove oil that has accumulated therein and force it back to the sump. However, the jet pump oil is therefore not filtered, which lowers the efficiency of the filtering operation and may require the use of a higher capacity oil pump in the lubricating system of the internal combustion engine. Furthermore, such jet pumps may require a very small diameter jet orifice which is easily clogged, rendering the jet pump inoperative.

SUMMARY OF THE INVENTION

The present invention provides an improved arrangement for preventing possible build-up of return oil in the filter housing by introducing a controlled amount of air at a pressure above atmospheric into a chamber below the filter to prevent the possibility of the oil level rising upward until it may contact the rotor.

It has been discovered that when the filter is in operation, there are two jet streams of oil coming out of the jet nozzles, and that these jets naturally impinge upon the inner wall of the outer housing, and break the jet up into a fine spray or mist of oil. When this is done, there is a certain amount of foaming of the oil which entrains some of the air present within the housing, and this entrained air passes with the oil through the return line to the sump. As this occurs, there is a continual small removal of air from the housing, and if this air is not replaced, the air pressure within the housing drops below atmospheric, causing a negative pressure on the return line and impeding the return flow of oil to the sump. Thus, as air is entrained and passes through the discharge line, the oil level tends to rise, and if it reaches the level of the lower end of the rotor, the rotor will be slowed, or even stopped, and efficient filtration will no longer take place.

According to a preferred embodiment of this invention, there is provided a regulator housing mounted directly below the filter housing, and which includes an air valve which is connected to a suitable source of air pressure such as an air brake compressor or other pump. A float is mounted within this regulator chamber and is actuated by the oil level within the chamber. As long as this oil level remains low, the air valve is closed and no additional air is admitted to the chamber. However, if the oil level begins to rise, as will occur when the entrainment of air from the jets within the return oil removes air from the filter housing, the oil level will begin to build up and raise the float. When the float reaches a predetermined position, it will open the air valve so that air from the pressure source enters the regulator chamber, and hence, by its direct connection, the interior of the filter housing. Because of this positive action, the air pressure within the filter housing will rise above atmospheric and increase the force on the oil within the return line, to increase the rate of return flow and lower the oil level within the regulator chamber. It has been found that, regardless of the pressure of the air source, it is never necessary to increase the pressure within the filter housing by more than a few psi, so that the pressure drop of oil across the rotor orifices or jets remains substantially the same, to allow the filter to function in the normal manner. However, it is noted that the amount of air that is added through the regulator is relatively small in volume, and corresponds only to the amount of entrained air removed through the oil flowing back to the sump.

Another feature of this invention is that it has been found possible to greatly reduce the diameter of the return line from the air regulator back to the sump. The return lines formerly were sized to allow a free drain without any pressure assist other than normal forces of gravity, since it was always a procedure to mount the filter substantially above the oil level in the sump. Using the regulator of this invention, it is now possible to use a return line that is not much larger than, and may even be equal in size to, the oil supply line from the engine oil pump. Furthermore, the mounting arrangement possibilities are greatly increased, since the use of a smaller drain hose provides greater flexibility for the hose, and therefore more convoluted paths of the hose, without creating undesirable restrictions against return or drain flow of the oil. Additionally, it is even possible to mount the filter below the level of oil in the sump, since there is now a small positive pressure which can overcome the forces of gravity and possibly force the oil to the return line into the sump.

Still another feature of this invention is that it may be incorporated into centrifugal filters of the disposable type such as those shown in U.S. Pat. Nos. 4,106,689 and 4,165,032. The float may be mounted within the disposable container and so arranged that it controls the actuation of an air valve in an air supply line connected directly to the casing of the disposable filter. Since the air valve can be mounted directly in the casing, this means that when the filter is full it can be removed and replaced very quickly, and therefore requires only the removal of the canister in its connection lines as well as the disconnection and reconnection of the air supply line, so that the down-time of the machinery with which the filter is used is held to a minimum.

BRIEF DESCRIPTION OF THE DRAWINGS

FIG. 2 is an elevational, cross-sectional view through another embodiment of this invention utilizing a filter of the disposable type;

FIG. 3 is a cross-sectional view taken on line 3—3 of FIG. 2.

DETAILED DESCRIPTION OF THE INVENTION

Figure 1:
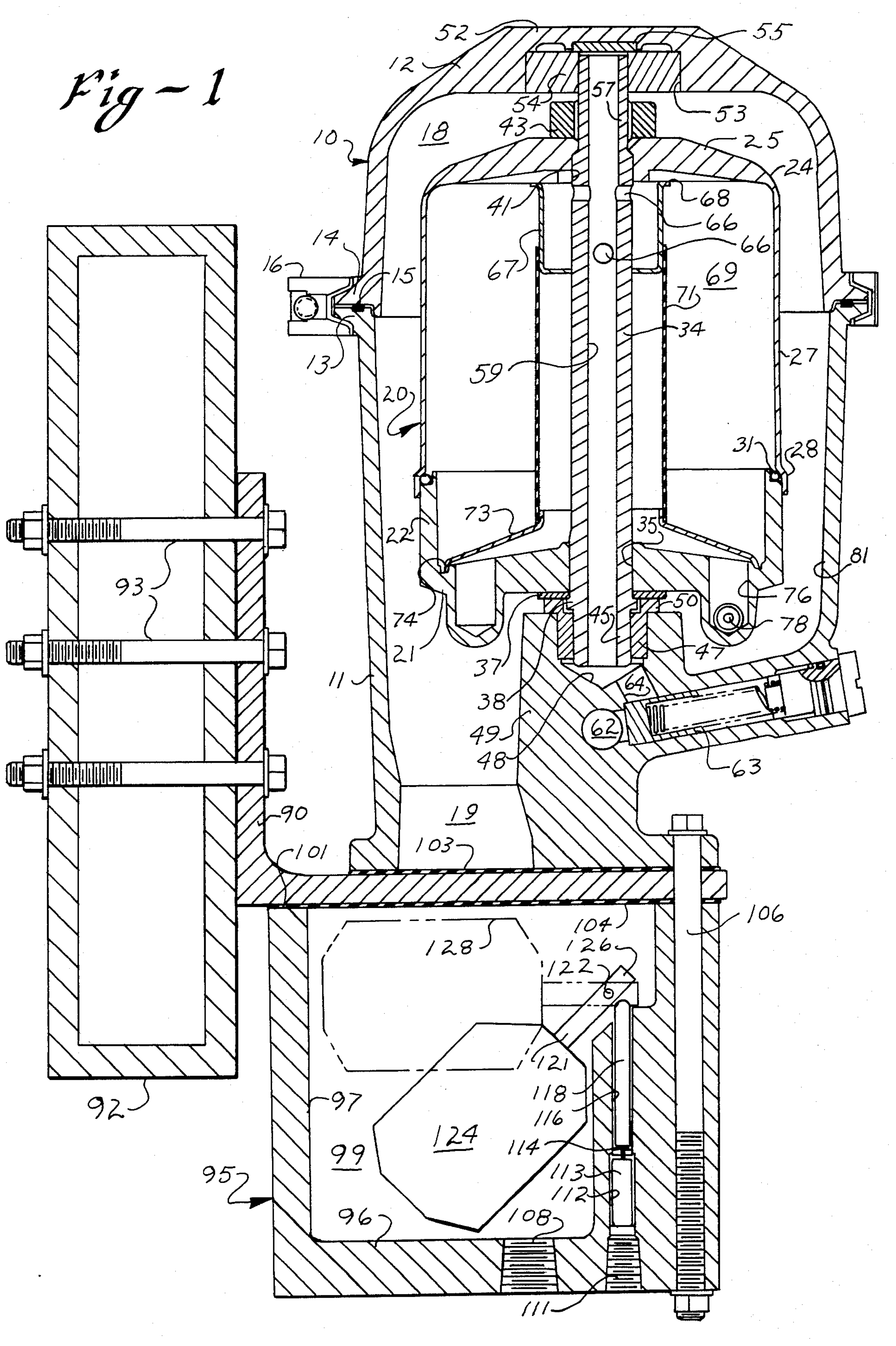
FIG. 1 is an elevational, cross-sectional view through a centrifugal filter and its mounting in accordance with the preferred embodiment of this invention.

Referring to FIG. 1 in greater detail, the centrifugal separator or filter 10 includes a lower housing member 11 and an upper housing member 12 which have flanges 13 and 14, respectively, which fit together in interlocking, telescoping relationship. A clamp 16 firmly holds the two members together and an O-ring seal 15 prevents any fluid leakage out of this joint. Between them, the upper and lower housings 12 and 11 define a housing chamber 18, which terminates at its lower end in a drain passage 19 extending downwardly and out through the bottom of the lower housing member 11.

Within the housing chamber 18 is mounted a rotor 20, which includes a rotor base member 21 having an upwardly extending, peripheral wall 22. The rotor also includes a cover 24 having a top wall 25 and a downwardly extending, peripheral sidewall 27 which terminates in an enlarged flange 28 adapted to fit over the upper end of the peripheral wall 22, and a suitable O-ring seal 31 is provided at this joint to prevent leakage of the oil within the rotor 20 outwardly into the housing chamber 18.

In order to mount the rotor 20 for rotation within the housing chamber 18, the rotor is provided with a spindle 34 which at its lower end extends through an aperture 35 in the rotor base 21. On the lower side of the base 21 is a thrust washer 37 which fits against a flange 38 on the lower end of the spindle. Likewise, the spindle 34 extends upwardly through an aperture 41 in the rotor cover top wall 25, and above the aperture 41 a nut 43 is threadedly engaged with a threaded portion on the spindle 34 so that, by tightening the nut 43, the rotor cover 24 is forced downwardly to firmly engage the base member at the seal 31, and force the base member against the thrust washer 37 and flange 38, so that the spindle 34 becomes an intergral part of the rotor 20, to rotate therewith.

The rotor 20 is mounted on a pair of bearings supported in the upper and lower housing members 12 and 11, respectively, and, accordingly, at its lower end, the spindle 34 has a journal portion 45 which fits within a bearing member 47 mounted in a recess 48 formed in projecting boss 49 on the lower housing member 11. The bearing 47 has an outwardly extending flange 50 above the recess 48 arranged to abut against the thrust washer 37 and support the weight of the rotor. Likewise, the top wall 52 of upper housing member 12 is provided with a formed recess 53 which receives a radial bearing 54 and thrust bearing 55 to journal the upper end 57 of spindle 34. The spindle 34 has a bore 59 of uniform diameter therethrough, so that the hydraulic forces at each end of the spindle 34 at the bearing recesses 48 and 53 are balanced, and the thrust washer 37 needs support only the weight of the rotor 20 independent of any pressure forces.

Oil is supplied under pressure to the separator 10 by a line from the oil pump of an internal combustion engine or other machine (not shown) and this line is connected to an inlet bore 62 formed in the lower housing member 11. The oil then passes through an isolating valve 63 and passage 64 to the bearing recess 48, from which it can enter the bore 59 and spindle 34. The isolating valve 63 is spring-biased to a closed position under low oil pressure conditions, such as at engine idle, so as not to rob oil from the engine bearings. This valve is optional and is not used in many applications. Therefore, it does not form any part of the present invention.

The oil passes upwardly through the spindle bore 59 toward the upper end, and flows outward through radial passages 66 adjacent a deflector cup 67. The oil then flows over the upper edge 68 of deflector cup 67 and into the rotor chamber 69. A cylindrical screen 71 extends coaxially with the spindle 34 and spaced away therefrom between the deflector cup 67 at the upper end in a conical baffle 73 at the lower end. Conical baffle 73 extends downwardly and outwardly to fit within an annular groove 74 formed in the rotor base member 21. When the rotor chamber 69 is full of oil, the pressure of the inwardly flowing oil causes some of the oil to pass radially inward through the screen 71 and below the conical baffle 73, where it flows into a a pair of vertical passages 76 formed within the rotor base member 21. At their lower ends, these passages 76 terminate in tangentially extending jet orifices 78, from which the oil is forced outwardly at relatively high velocity into the housing chamber 18. The outward flow of oil at high velocity through the jet orifices 78 then, by the reaction forces, causes the rotor 20 to rotate at high speed within the housing chamber 18, and the centrifugal force that results from such high rotational speeds causes any particulate material to move toward the rotor wall 81, where this particulate material tends to build up as a layer and, under the high gravitational forces, this particulate matter tends to congeal to a rubbery mass that can be scraped out and removed when the separator is disassembled.

The separator 10 must be mounted in a generally vertical position for optimum performance, so that there is a minimum of unbalanced forces acting on the rotor 20. Accordingly, the lower housing member is secured to the mounting bracket 90, which in turn is secured to a frame rail indicated at 92 of a motor vehicle or other support by means of suitable bolts 93. In accordance with the prior art teachings, the return flow of oil from the housing chamber 18 to the sump of the internal combustion engine was performed by providing a suitable fitting connected to the drain passage 19 so that the oil could then pass by a suitable flexible hose or pipe to the oil pump. Under normal conditions, this return line had to be of relatively large diameter because, for optimum speed of the rotor, no oil could be allowed to accumulate within the housing chamber 18, which is normally filled with air which may enter through the drain line by counterflow from the sump or by means of an air bleed valve, which is no longer required with the present invention. Since there is substantially no pressure drop between the housing chamber 18 and the oil sump, the return line must be of relatively large diameter to prevent fluid from building up within the housing chamber 18, because if the level does build up where the oil can reach the level of the rotor base member 21, the frictional drag will cause the rotor to rotate at a much lower speed, thereby greatly decreasing the centrifugal forces required to produce the effective filtering action of these separators, and consequently little or no particulate matter will be removed from the lubricating oil.

According to the principles of the present invention, it has been determined that the build up of oil within the housing chamber 18 can readily occur under a number of circumstances, and therefore such centrifugal filters will tend to lose their efficiency. Since in most applications it is not readily possible to determine the speed of rotation of the rotor within the separator, the loss of this efficiency is often not discovered until the separator is disassembled for cleaning and an unexpectedly low build up of particulate matter discovered. Of course, when this occurs, it is often too late because the oil has been highly contaminated, and unnecessary wear of the internal combustion engine has already occurred. The primary reason for this action has been discovered to be the fact that there is a previously unsuspected process for removing air from within the housing chamber 18.

As the jets of oil pass outwardly at high velocity through the orifice 78—and this velocity can be quite high because substantially all of the pressure drop between the supply line and atmosphere takes place across the orifice 78—the oil impinges upon the interior wall of the lower housing member 11. Under this action, the jet of oil is broken up into a fine spray of droplets, which tend to entrain or dissolve the air therein, either by actual solution or by forming a foam, and as the oil with the entrained air passes back to the sump, it necessarily tends to cause the pressure within the housing chamber 18 to drop so that the oil level will rise upwardly within the drain passage 19. Accordingly, the present invention solves this problem by admitting additional air into the housing chamber 18 to replace the air removed by the entraining action of the oil, to positively prevent the oil level from rising to contact the rotor base member 21.

To admit the air into the housing chamber 18, there is provided a regulator housing 95 having a bottom wall 96 and sidewalls 97 defining a chamber 99. The regulator housing 95 is positioned below the mounting bracket 90, and has a top surface 101 which is clamped against a gasket 104 to the lower side of the mounting bracket 90. Likewise, the separator 10 can be mounted on the upper side of the mounting bracket 90 using a gasket 103 and, by extending bolts 106 through the lower housing member 11, the mounting bracket 90, and the regulator housing 95, the entire assembly can be clamped together in a unitary relationship.

A drain opening 108 is provided in the regulator housing bottom wall 96, and to this is connected a return line to the engine sump. The regulator housing 95 also includes an air inlet fitting 111 to which is connected an air supply line from a suitable source, such as an air brake compressor or the like. Directly above the inlet 11 is a reduced diameter threaded bore 112 within which is mounted a valve 113 having an upwardly projecting valve stem 114. This valve may be constructed in the manner of an ordinary tire valve, which is normally closed so that the air at the inlet 111 cannot pass the valve. However, whenever the stem 114 is depressed, the valve is opened to allow the passage of air. Directly above the valve stem 14 is a bore 116 within which is mounted a valve rod 118 having a smaller diameter than that of bore 116, to allow the passage of air between the valve rod and bore upwardly into the regulator chamber 99. Within the chamber 99 is mounted a float arm 121 carried by a pivot pin 122 secured in the regulator housing adjacent the upper end of valve rod 118. At the one end, the float arm 121 is connected to a hollow float 124, which is free to move within the chamber 99 as the arm 121 pivots about the pivot pin 122. The float arm also has an actuating end 126 which extends in the opposite direction from the pivot pin 122 to a point above the valve rod 118.

As shown in solid lines in FIG. 1, when there is no oil within the regulator chamber 99, the float 124 normally is in a lowered position so that the actuating end 126 of float arm 121 is spaced above the valve rod 118. Since the valve stem 114 is in a closed position, no air enters the chamber through the inlet 111. When the filter is operating so that oil is discharged into the housing chamber 18 to flow downwardly through the drain passage 19, oil may build up within the regulator chamber 99, and if the oil level begins to rise because of insufficient flow rate through the drain opening 108, the float may rise to the position shown in phantom lines at 128. When the oil reaches this level, the actuating end 126 of float arm 121 then presses downward on the valve arm 118 to depress the valve stem 114. When this is done, air enters through the inlet 111, past the valve 113 and valve rod 118, into the chamber 99. The presence of this air in the chamber 99, and hence in chamber 18, will assist the return flow of the oil and the float 124 may cycle upwardly and downwardly to admit the amount of air required to make up for the air removed by entrainment through the return flow of the lubricating oil.

It will be understood that if the return line connected to the drain opening 108 is of quite large diameter, the pressure within the regulator chamber 99 and housing chamber 118 will still be at substantially atmospheric pressure. On the other hand, it has been found possible to greatly reduce the diameter of the return line connected to drain opening 108 to perhaps one-fourth the diameter previously used, and in some cases no larger diameter than that of the supply line to the filter. Likewise, the separator 10 may be located below the oil level in the engine sump, so that there may be a tendency for reverse flow of the oil drain line. In either case, the regulator of this invention will then admit air into the housing chamber 18 and the pressure may tend to build up above atmospheric pressure to produce the necessary pressure forces to cause a sufficient rate of flow to the sump through the return line to keep the oil level in the regulator housing so that the float is positioned below the phantom line position shown at 128. It should be pointed out that this arrangement now allows the filter to be mounted below the sump level and when the engine is not running, the balance of forces may actually cause the entire housing chamber 18 to be filled with oil by return flow through the drain line. This causes no undesirable condition, but merely a slight delay in the operation of the filter when the engine is started. Thus, though the housing chamber 18 may be full of oil when the engine starts, the float will be in the upper position and air will immediately enter through the inlet 111, and hence into the housing chamber 18. This then drives the oil level down and when it drops below the level of the rotor base member 21, the rotor may then begin to rotate in the customary manner and the oil level will continue downward until stabilized by the position of float 124 in the manner previously described.

It should be pointed out that the source of air connected to the air inlet 111 need have a pressure only a small differential above that required within the housing chamber 18. Thus, if the maximum pressure expected within the housing 18, either because of a low position of the filter or a relatively small drain line, may be in the range of 3 to 10 psi, a pressure source in the range of 15 to 20 psi may be sufficient, although higher pressures, such as those of air brake compressors, may also be used so long as such pressures are within the capacity of the valve 113. In any case, it should be pointed out that the volume of air required is relatively small because the volume of air required is only that needed to make up for the air removed by entrainment in the oil. That is, the volume of air that may flow through the filter is relatively small compared to the volume of oil flowing through the separator between the inlet bore 62 and the drain opening 108. Thus, the volume of air does not assist in the return flow except to make up for the entrained air and, for that reason, it is necessary to allow the float 124 to position itself where the valve 113 can close, since the failure of this valve to close at a stable point would result in an excess flow of air into the system, which would tend not only to pressurize the chamber 118, which would reduce the filter's efficiency because the oil pressure drop across the orifice 78 would be reduced and thereby reduce the reaction forces causing the rotors to spin, but also because such excess air might cause foaming or frothing of the oil in the sump, which could adversely affect the lubrication of the internal combustion engine.

As shown in FIGS. 2 and 3, the invention is also applicable not only to the centrifugal separators of the permanent type, which are intended to be disassembled, cleaned, and thereafter reassembled, but also to centrifugal separators of the disposable type, such as those shown in U.S. Pat. Nos. 4,106,689 and 4,165,032, both of which patents are incorporated by reference herein in their entirety. The centrifugal filter shown in FIGS. 2 and 3 generally conforms to that shown in the above patents except for the additional structure for admitting air into the housing and for the elimination of the air bleed valve shown in those patents, which is not required with the present invention.

As shown in FIG. 2, the separator 140 includes a thin sheet metal housing shell 141 defining a shell chamber 142 and closed at the one end by a cover 143 joined to the shell 141 along a suitable seam 144. Within the cover 143 is a rigid support disc 145, while the cover 143 also carries an annular sealing gasket 147. An inlet fitting 148 is centrally mounted on the support disc 145 to engage a suitable fitting 149 formed on the engine block 150 against which the gasket 147 seals when the separator 140 is installed in place.

The inlet fitting 148 also serves to support a spindle 152, the lower end of which is resiliently supported by a helical compression spring 154 abutting at the one end against the lower end of spindle 152 and at the other end against an outlet fitting 156 secured in the closed bottom end of the housing shell 141. It will be understood that the outlet fitting 156 is connected back to the sump of the engine in the usual manner.

Mounted within the shell chamber 142 is a rotor 158 having a central tube 159 rotatably journaled on bearings 160 and 161 at the upper and lower ends, respectively, of the spindle 152. The rotor 158 has a shell 164 which, in combination with the rotor tube 159, forms a sealed enclosed rotor chamber 165 which, in operation, will be pressurized with respect to the shell chamber 142. The rotor 158 includes a lower wall 166 adjacent the lower bearing 161 which is provided with a pair of downwardly extending, hollow projections 167 which carry the jet openings 168 to rotatably drive the rotor 158 within the separator as a result of the pressure admitted through the inlet fitting 148.

It will be seen that the centrifugal separator described above is substantially the same as that disclosed in U.S. Pat. No. 4,106,689, except that, as shown in FIG. 2, the housing shell 141 has a greater vertical extent and the support spring 154 is likewise longer, to increase the space available within the housing shell 141 below the rotor 158. Within this space is mounted a float arm 170 which may be made of a thin, flexible sheet material and has an end 171 secured to the inside of the housing shell 141. At its other end, the float arm 170 has a pair of fork arms 173 passing on each side of the spring 154 and to which is secured a hollow float 175. Another inlet fitting 177 is secured in the lower wall of the housing shell 141 adjacent the float arm 171 and is provided with a valve seat end 178 within the shell chamber 142. A suitable valve member 180, such as a molded piece of rubber, is secured to the float arm 170 adjacent the valve seat 178. Another inlet tube 182 is connected to the fitting 177 and through a suitable check valve 183 to a source of air under pressure.

With this arrangement, it will be seen that when the separator 140 is operating normally and is located in an upright orientation as shown in FIG. 2, as long as there is no oil in the lower end of the shell chamber 142, the float arm 170 will assume the position shown in FIG. 2, with the float 175 at the lowermost position and the valve member 180 in contact with the valve seat 178, so that no air is admitted into the shell chamber 142. In the event that the oil does not drain to the sump through the outlet fitting 156 as fast as it is supplied through the inlet fitting 148, the oil level will tend to move upwardly within the shell chamber 142 until the hollow float 175 moves upward toward the rotor 158. When this occurs, the valve member 180 moves off the valve seat 178 so that air is admitted into the shell chamber 172 through the fitting 177, to make up for the air which is entrained in the oil passing back to the sump.

Thus, the disposable type of centrifugal separator shown in the embodiment of FIGS. 2 and 3 functions in the same manner as the embodiment of FIG. 1. Furthermore, when the centrifugal filter becomes full of sediment within the rotor 158, it is simply removed and replaced with a new one by unscrewing it from the fitting 149 after disconnecting tubes from the outlet fitting 156 and the air inlet fitting 177, and after a new separator is attached to the fitting 149, these tubes are reattached in the usual manner.

Figure 4:
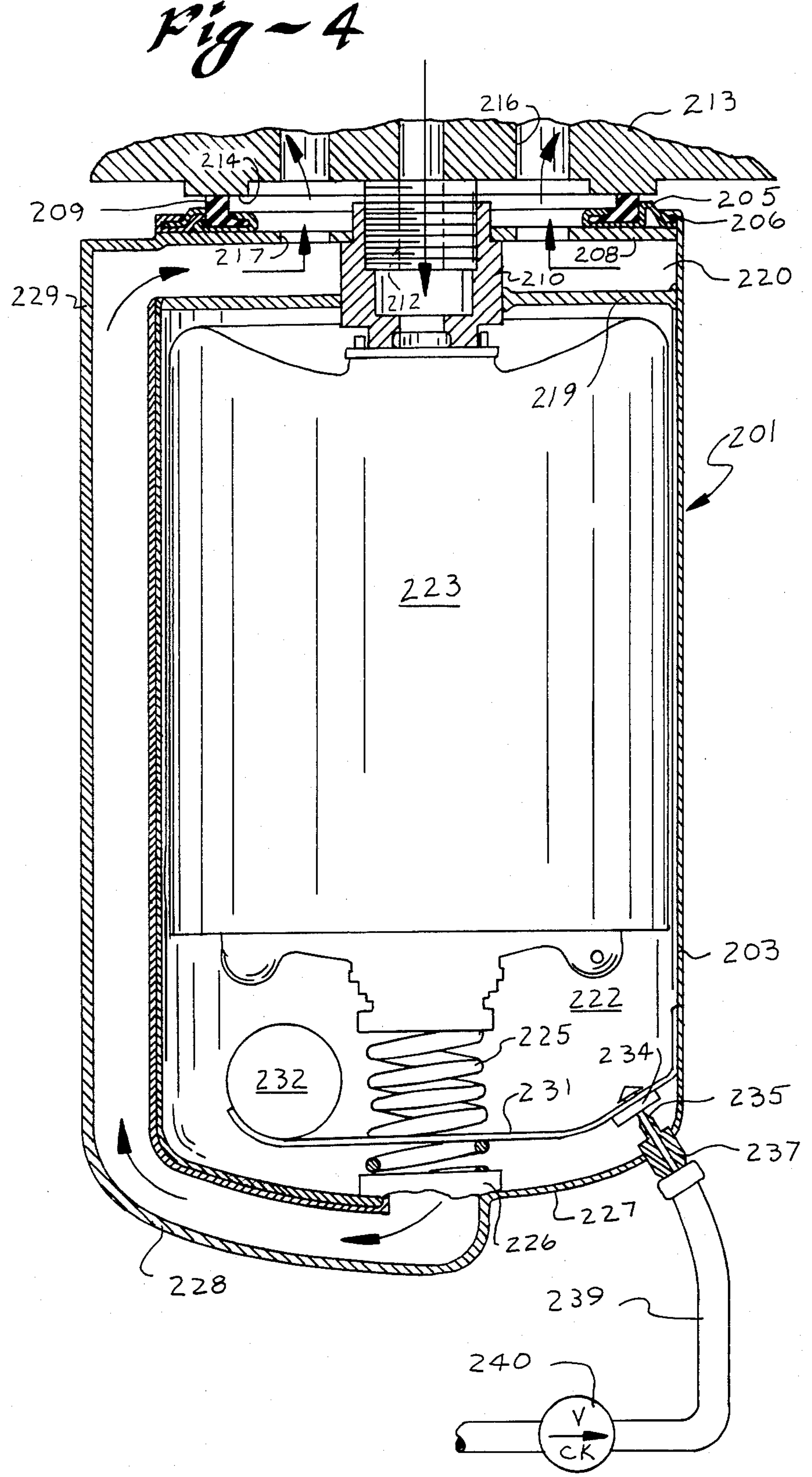
FIG. 4 is an elevational view partially in cross section of still another embodiment of this invention.

Another embodiment of a disposable centrifugal filter is shown in FIG. 4, which eliminates the separate connection for the outlet fitting 156 of the embodiment of FIGS. 2 and 3. As shown in FIG. 4, the separator 201 includes a housing or shell 203 which is generally cylindrical in shape and is closed by a cover 205 at the one end, secured to the shell 203 along a seam 206. An outer support disc 208 is secured inside the shell 203 adjacent the cover 205, while the latter also mounts an annular gasket 209. An inlet fitting 210 is mounted in the support disc 208 at the center thereof for engagement with a fitting 212 carried on an engine block 213. The block 213 also has an annular boss 214 against which the gasket 209 makes sealing engagement. An inlet fitting 210 is fully threaded in the fitting 212. Also provided in the engine block 213 are drain passages 216 leading to the sump of the engine and communicating with the annular space between the fitting 212 and the annular boss 214. Likewise, apertures 217 are formed in the outer support disc 208, as will be explained in greater detail hereinafter.

An inner support disc 219 is also mounted within the shell 203 a spaced distance inwardly from the outer support disc 208 and extending generally parallel thereto. The inner support disc 219 makes sealing engagement with the shell 203, and also with the inlet fitting 210, to thereby define a drain chamber 220 between the two support discs, as well as the shell chamber 222 below the inner support disc 219. A rotor 223 is mounted in the chamber 222 in the same manner as in the embodiment shown in FIG. 2, and since the structure is essentially the same, it has not been shown in detail in FIG. 4. A support spring 225 similar to support spring 154 is mounted in the lower end of the shell 203 to abut against the rotor 223 on the upper end and against an outlet fitting 226 formed in the bottom wall 227 of the shell 203. A drain tube 228 makes sealing engagement with the outlet fitting 226 on the lower side of bottom wall 227, and extends along the surface of the shell 203 upwardly toward the engine block 213, where at its upper end 229 it opens into the drain chamber 220.

Thus, as with the embodiment of FIG. 2, the oil enters the filter assembly through the inlet fitting 210, passes into the rotor 223, and, on discharge through the jets, enters the shell chamber 222. The oil then flows from the outlet fitting 226 through the drain tube 228, upwardly into the drain chamber 220, where it passes through the apertures 217 and outer support disc 208, to return to the engine through the drain passages 216.

The mechanism for admitting air into the shell chamber 222 is substantially the same as that shown in the embodiment of FIG. 2. A float arm 231 is mounted in the lower portion of the shell chamber 222 and carries a float 232 at the free end. At the other end of float arm 231 is mounted a valve member 234 adapted to make sealing contact against the valve seat 235 carried on air inlet fitting 237. Air is supplied by an inlet tube 239 through a check valve 240, which prevents any possible flow of oil out through the air inlet tube 239.

With the filter of the embodiment of FIG. 4, it will be understood that if the filter is mounted on an internal combustion engine and the engine is shut down, there may be a tendency of the shell chamber 222 to fill with oil, since there is no longer any incoming flow through the inlet fitting 210. Since the drain passages are above the filter itself, it would then be a normal tendency for some of the oil to drain back through the drain tube 228 in a reverse direction of flow under these conditions. However, such action will then cause the float 232 to rise upwardly to move the valve member 234 away from the valve seat 235 and if air is still being supplied through the inlet tube 239, this air will tend to pressurize the shell chamber 222 a slight amount to force sufficient oil outwardly through the drain tube 228 until the valve again recedes. On the other hand, if the supply of air is discontinued at the same time, there would be a tendency for the oil in the chamber 222 to flow outwardly through the air inlet fitting 237 if the float 232 is in a raised position because of the oil level inside the chamber. In this case, the check valve 240 positively prevents any reverse flow of oil through the air inlet line 239, and when the engine is restarted and the air supply turned on, the air will immediately enter through the inlet fitting 237 until conditions are stabilized in the manner discussed previously.

While several preferred embodiments of the invention have been shown and described in detail, it is understood that other embodiments, modifications, and rearrangements may be used without departing from the scope of the invention as defined in the following claims.

What is claimed is:

1. A centrifugal oil filter system for a machine having an oil pump adapted to supply oil under pressure and a sump, said filter including a casing defining a first chamber having an upper end and a lower end, a drain line between said chamber lower end and said sump, an oil pressure line connected between said oil pump and said casing, a rotor in said chamber upper end mounted for rotation about a substantially vertical axis and having an interior supplied with oil under pressure from said pressure line, said rotor having jets to discharge oil into said chamber and by reaction cause said rotor to rotate, the improvement comprising means to supply air under pressure to said chamber to replace air entrained in the oil returning to said sump and thereby prevent a build up of oil within said chamber, said air supply means including sensing means responsive to the oil level in said chamber lower end and a valve operated by said sensing means and connected to a source of pressurized air.

2. A centrifugal oil filter system as set forth in claim 1, wherein said sensing means is a float.

3. A centrifugal oil filter system as set forth in claim 2, including a float arm movably mounted with respect to said casing, and said float is secured to said float arm.

4. A centrifugal oil filter system as set forth in claim 3, wherein said float is located in a second chamber positioned below said first chamber.

5. A centrifugal oil filter system as set forth in claim 4, wherein said float is located in said second chamber.

6. A centrifugal oil filter system for a machine having an oil pump adapted to supply oil under pressure and a sump, said filter including a casing defining first and second chambers, a drain line between said second chamber and said sump, an oil pressure line connected between said oil pump and said casing, a rotor in said first chamber having an interior supplied with oil under pressure from said pressure line, said rotor having jets to discharge oil into said first chamber and by reaction cause said rotor to rotate, a drain passage connecting said first and second chambers, a float mounted in said second chamber movable in response to the oil level in said second chamber, and a valve operated by said float and connected to a source of pressurized air to supply pressurized air to said second chamber and through said drain passage to said first chamber to replace air entrained in the oil returning to said sump and thereby prevent a build-up of oil within said first and second chambers.

7. A centrifugal oil filter system as set forth in claim 6, wherein said second chamber is located below said first chamber.

8. A centrifugal oil filter system as set forth in claim 6, including a float arm pivotally mounted in said second chamber, said float being secured to said float arm, and means on said float arm to operate said valve.

9. A centrifugal oil filter system for an internal combustion engine having an oil pump adapted to supply oil under pressure and a sump, said filter including a casing defining a chamber having an upper and a lower end, a drain line between said chamber lower end and said sump, an oil pressure line connected between said oil pump and said casing, a rotor in said chamber upper end mounted for rotation about a substantially vertical axis and having an interior supplied with oil under pressure from said pressure line, said rotor having jets to discharge oil into said chamber and by reaction cause said rotor to rotate, the improvement comprising float-operated valve means in said chamber lower end to supply air under pressure to said chamber to replace air entrained in the oil returning to said sump and thereby prevent a build-up of oil within said chamber.

10. A centrifugal oil filter system as set forth in claim 9, including mounting means for mounting said filter casing on said engine.

11. A centrifugal oil filter system as set forth in claim 10, wherein said mounting means comprises a threaded fitting interconnecting said mounting means and said casing and said oil pressure line passes through said fitting.

12. A centrifugal oil filter system as set forth in claim 11, wherein said mounting means also includes said drain line.

13. A centrifugal oil filter system as set forth in claim 9, wherein said float-operated valve means includes a float arm, said float being secured to one end of said float arm and a valve member is mounted on said float arm.

14. A centrifugal oil filter system as set forth in claim 13, wherein said valve member cooperates with a valve seat on said casing and said valve seat is carried by a fitting connected to a source of pressurized air.

15. A centrifugal oil filter system as set forth in claim 14, wherein said float arm is flexible and the other end of said float arm is secured to said casing.

16. A centrifugal oil filter including a casing defining a chamber having an upper end and a lower end, a drain line for draining oil away from said chamber lower end, an oil pressure line connected to said casing, a rotor in said chamber upper end mounted to rotation about a substantially vertical axis and having an interior supplied with oil under pressure from said pressure line, said rotor having jets to discharge oil into said chamber and by reaction cause said rotor to rotate, the improvement comprising regulator means adapted to be connected to a source of air pressure to supply air under pressure to said chamber to replace air entrained in the oil in said drain line and thereby prevent a build up of oil within said chamber, said regulator means including sensing means responsive to the oil level in said chamber lower end and a valve operated by said sensing means to admit air to said chamber when said oil level rises above a predetermined level below said rotor.

17. A centrifugal oil filter system as set forth in claim 16 wherein said sensing means is a float.

* * * * *